United States Patent
Song et al.

(10) Patent No.: US 8,941,354 B2
(45) Date of Patent: Jan. 27, 2015

(54) BATTERY SYSTEM

(75) Inventors: Byung-Il Song, Yongin-si (KR);
Han-Seok Yun, Yongin-si (KR); Tetsuya Okada, Yongin-si (KR); Jong-Woon Yang, Yongin-si (KR); Eui-Jeong Hwang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 498 days.

(21) Appl. No.: 13/422,970

(22) Filed: Mar. 16, 2012

(65) Prior Publication Data

US 2012/0280694 A1 Nov. 8, 2012

(30) Foreign Application Priority Data

May 4, 2011 (KR) .................. 10-2011-0042621

(51) Int. Cl.
*H01M 10/46* (2006.01)
*H04Q 9/00* (2006.01)

(52) U.S. Cl.
CPC ............. *H04Q 9/00* (2013.01); *H04Q 2209/10* (2013.01); *H04Q 2209/30* (2013.01)
USPC ........................................................ 320/116

(58) Field of Classification Search
USPC .................... 320/116, 117, 118, 119
See application file for complete search history.

(56) References Cited

U.S. PATENT DOCUMENTS

| | | | |
|---|---|---|---|
| 7,760,106 B2 * | 7/2010 | Vandensande et al. ..... | 340/636.1 |
| 2005/0029986 A1 * | 2/2005 | Morgan ........................ | 320/118 |
| 2007/0090793 A1 | 4/2007 | Eguchi et al. | |
| 2010/0052615 A1 * | 3/2010 | Loncarevic .................... | 320/118 |
| 2012/0025769 A1 * | 2/2012 | Kikuchi et al. ............... | 320/118 |

FOREIGN PATENT DOCUMENTS

| | | |
|---|---|---|
| JP | 2008-131670 A | 6/2008 |
| JP | 2010-003536 A | 1/2010 |
| KR | 10-2000-0042154 A | 7/2000 |
| KR | 10-2007-0043677 A | 4/2007 |
| KR | 10-2007-0105220 A | 10/2007 |

OTHER PUBLICATIONS

Korean Notice of Allowance dated Sep. 21, 2012 for Korean Patent Application No. KR 10-2011-0042621 which corresponds to captioned U.S. Appl. No. 13/422,970.

* cited by examiner

*Primary Examiner* — Edward Tso
(74) *Attorney, Agent, or Firm* — Knobbe, Martens, Olson & Bear, LLP (57) ABSTRACT

A battery system is disclosed. In one embodiment, the system includes i) a plurality of battery modules each of which is configured to store power, wherein each battery module is electrically connected to at least one other battery module and ii) a plurality of management units configured to monitor states of the battery modules. Each management unit is electrically connected to at least one other management unit and one or more of the battery modules. Each management unit may include: at least one measuring unit configured to perform the monitoring and a receiving unit configured to i) receive measurement data including the monitoring results from the measuring unit via a first communication protocol and ii) receive measurement data from another receiving unit included in another management unit via a second communication protocol different from the first communication protocol.

20 Claims, 5 Drawing Sheets

FIG. 5

BATTERY SYSTEM

RELATED APPLICATIONS

This application claims the benefit of Korean Patent Application No. 10-2011-0042621, filed on May 4, 2011, in the Korean Intellectual Property Office, the disclosure of which is incorporated herein in its entirety by reference.

BACKGROUND

1. Field

The described technology generally relates to battery systems.

2. Description of the Related Technology

Recently, batteries are used across a broad spectrum of technology from portable appliances such as mobile phones and laptop computers to large-scale equipment such as electric vehicles and energy storage systems. Batteries form a battery system together with control circuits for controlling charging or discharging of the batteries, and research is actively conducted on developing methods of efficiently managing such batteries.

Meanwhile, when batteries are used in electric vehicles or energy storage systems, compared to when batteries are used in portable appliances, sizes of battery systems increase, and thus amounts of data processed by devices for controlling such battery systems also increase. Accordingly, time consumed in transmitting data is to be reduced in order to efficiently process data within such battery systems.

SUMMARY

One inventive aspect is battery systems in which data communication may be efficiently conducted.

Another aspect is a battery system which includes: a plurality of battery modules that store power; and a plurality of management units that monitor states of the plurality of battery modules, wherein the plurality of management units each include: at least one measuring unit for performing the monitoring; and a receiving unit for receiving measurement data including results of the monitoring, wherein the receiving unit receives measurement data from the at least one measuring unit included in the management unit to which the receiving unit belongs, using a first communication method, and receives measurement data from another receiving unit included in another management unit using a second communication method.

The at least one measuring unit included in the same management unit may communicate with one another using the first communication method.

The battery system may further include an insulator circuit that is connected to one of the management units and receives all the measurement data, and the insulator circuit may receive measurement data from the management unit connected to the insulator circuit using the second communication method.

The measuring units and the receiving unit may include a first communication unit for performing the first communication method.

The receiving unit and the measuring unit connected to the receiving unit may perform the second communication method.

The first communication method may be an inter integrated circuit (I2C) method.

The second communication method may be a low voltage differential signaling (LVDS) method.

A data transmission speed according to the second communication method may be faster than a data transmission speed according to the first communication method.

Another aspect is a battery system which includes: a plurality of battery modules that store power; a plurality of management units that monitor states of the plurality of battery modules; and an insulator circuit that is connected to one of the plurality of management units and receives results of the monitoring, wherein the plurality of management units perform communication with one another using a first communication method, and the insulator circuit and the management unit connected to the insulator circuit communicate with each other using a second communication method.

Each of the plurality of management units may include: at least one measuring unit for performing the monitoring; and a receiving unit for receiving measurement data including results of the monitoring, wherein the receiving unit receives measurement data from the receiving unit included in another management unit using the first communication method.

The receiving unit included in the management unit connected to the insulator circuit may perform communication with the insulator circuit using the second communication method.

The at least one measuring unit included in the same management unit may communicate with one another using the first communication method.

The management units may include a first communication unit for performing the first communication method.

The insulator circuit and the management unit connected to the insulator circuit may include a second communication unit for performing the second communication method.

The first communication method may be an inter integrated circuit (I2C) method.

The second communication method may be a low voltage differential signaling (LVDS) method.

A data transmission speed according to the second communication method may be faster than a data transmission speed according to the first communication method.

Another aspect is a battery system which includes: a plurality of battery modules that store power; a plurality of measuring units that monitor states of the plurality of battery modules and are divided into a first group and a second group; a first sub-data collecting unit that collect measurement data including monitoring results from a plurality of the measurement units included in the first group; a second sub-data collecting unit that collect measurement data including monitoring results from a plurality of the measurement units included in the second group; a first data collecting unit that collect the measurement data collected by the first data collecting unit and the second data collecting unit; and an insulator circuit that receives the measurement data collected by the first data collecting unit, wherein a communication method used by the plurality of measuring units to transmit the measurement data to the first sub-data collecting unit and the second sub-data collecting unit and a communication method used by the first data collecting unit to transmit the measurement data to the insulator circuit are different from each other.

A communication method used by the plurality of measuring units to transmit the measurement data to the first sub-data collecting unit and the second sub-data collecting unit and a communication method used by the second sub-data collecting unit to transmit the measurement data to the insulator circuit may be different from each other.

A communication method used by the first sub-data collecting unit and the second sub-data collecting unit to transmit the measurement data to the first data collecting unit and a communication method used by the first data collecting unit to transmit the measurement data to the insulator circuit may be different from each other. Another aspect is a battery system comprising: a plurality of battery modules each of which is configured to store power, wherein each battery module is electrically connected to at least one other battery module; and a plurality of management units configured to monitor states of the battery modules, wherein each management unit is electrically connected to at least one other management unit, and wherein each of the management units is electrically connected to one or more of the battery modules, wherein each of the management units comprises: at least one measuring unit configured to perform the monitoring; and a receiving unit configured to i) receive measurement data including the monitoring results from the at least one measuring unit via a first communication protocol and ii) receive measurement data from another receiving unit included in another management unit via a second communication protocol which is different from the first communication protocol.

In the above battery system, the at least one measuring unit comprises a plurality of measuring units which are configured to communicate data with one another via the first communication protocol. In the above battery system, each of the measuring unit and the receiving unit comprises a first communication unit which is configured to communicate data via the first communication protocol.

The above battery system further comprises an insulator circuit electrically connected to one of the management units and configured to receive all the measurement data from the one management unit via the second communication protocol. In the above battery system, each of i) the insulator circuit and ii) the receiving unit electrically connected to the insulator circuit comprises a second communication unit which is configured to communicate data via the second communication protocol. In the above battery system, the first communication protocol is an inter integrated circuit (I2C) protocol. In the above battery system, the second communication protocol is a low voltage differential signaling (LVDS) protocol.

In the above battery system, the data transmission speed of the second communication protocol is faster than that of the first communication protocol. In the above battery system, each of the battery modules comprises at least one battery cell, and wherein the states of the battery modules comprise at least one of the following: voltages, charging states, temperatures and other electrical or chemical characteristics of the battery cells.

Another aspect is a battery system comprising: a plurality of battery modules each of which is configured to store power, wherein each battery module is electrically connected to at least one other battery module; a plurality of management units configured to monitor states of the battery modules, wherein each of the management units is electrically connected to one or more of the battery modules, and wherein each management unit is configured to communicate data with at least one other management unit via a first communication protocol; and an insulator circuit electrically connected to one of the management units and configured to receive the monitoring results from the one management unit via a second communication protocol which is different from the first communication protocol.

In the above battery system, each of the management units comprises: at least one measuring unit configured to perform the monitoring; and a receiving unit configured to i) receive measurement data including the monitoring results from the at least one measuring unit via the first communication protocol and ii) receive measurement data from another receiving unit included in another management unit via the second communication protocol. In the above battery system, each of i) the insulator circuit and ii) the receiving unit electrically connected to the insulator circuit comprises a second communication unit which is configured to perform data communication via the second communication protocol.

In the above battery system, the at least one measuring unit comprises a plurality of measuring units which are configured to communicate data with one another via the first communication protocol. In the above battery system, each of the battery modules comprises at least one battery cell, and wherein the states of the battery modules comprise at least one of the following: voltages, charging states, temperatures and other electrical or chemical characteristics of the battery cells. In the above battery system, the first communication protocol is an inter integrated circuit (I2C) protocol. In the above battery system, the second communication protocol is a low voltage differential signaling (LVDS) protocol. In the above battery system, the data transmission speed of the second communication protocol is faster than that of the first communication protocol.

Another aspect is a battery system comprising: a plurality of battery modules each of which is configured to store power, wherein each battery module is electrically connected to at least one other battery module; a plurality of measuring units configured to monitor states of the battery modules and are divided into a first group and a second group, wherein the first group includes a first plurality of measuring units, wherein the second group includes a second plurality of measuring units, wherein each management unit is electrically connected to at least one other management unit, and wherein each of the management units is electrically connected to one or more of the battery modules; a first sub-data collection unit configured to receive first measurement data including monitoring results from the first measurement units via a first communication protocol; a second sub-data collection unit configured to receive second measurement data including monitoring results from the second measurement units via the first communication protocol; and an insulator circuit configured to receive the first and second measurement data via a second communication protocol which is different from the first communication protocol.

In the above battery system, the first and second sub-data collection units are configured to transmit the measurement data to a first data collection unit via the first communication protocol, wherein the first data collection unit is configured to receive the measurement data from the first and second sub-data collection units and provide the received measurement data to the insulator circuit, and wherein the second sub-data collection unit is configured to transmit the measurement data to the insulator circuit via the second communication protocol. In the above battery system, the data transmission speed of the second communication protocol is faster than that of the first communication protocol.

DETAILED DESCRIPTION

Embodiments will be described below in more detail with reference to the accompanying drawings. Components that are the same or are in correspondence are rendered the same reference numeral regardless of the figure number, and redundant explanations are omitted. Furthermore, certain detailed explanations of related art are omitted when it is deemed that they may unnecessarily obscure the essence of the embodiments.

Figure 1:
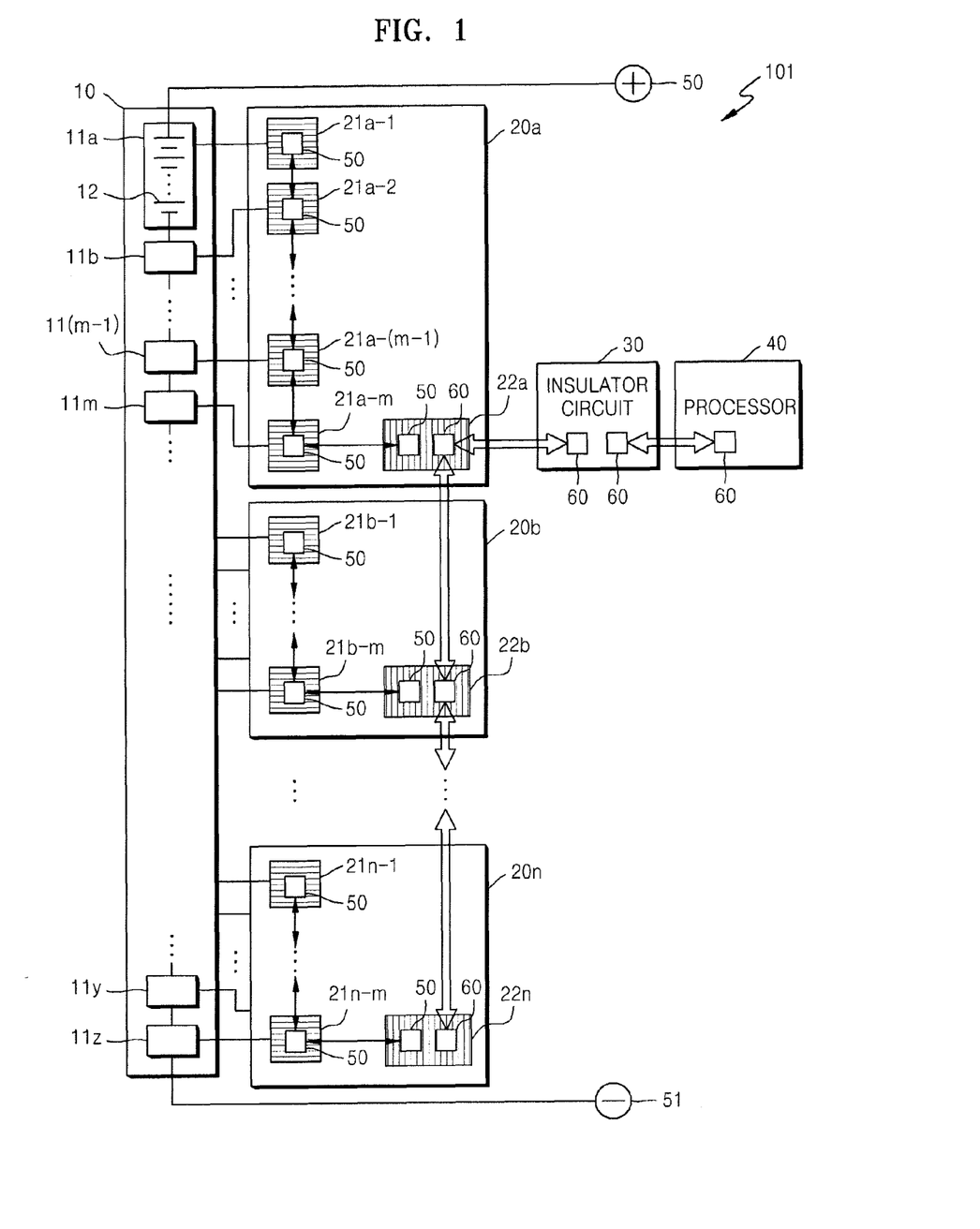
FIG. 1 is a block diagram illustrating a battery system according to an embodiment.

FIG. 1 is a block diagram illustrating a battery system 101 according to an embodiment.

Referring to FIG. 1, the battery system 101 includes a battery 10, a plurality of management units 20a through 20n, an insulator circuit 30, and a processor 40. The battery system 101 may include additional elements or omit some of the above elements depending on the embodiment.

The battery 10 stores power supplied from an external power source through charging, and supplies the stored power to an external power storage through discharging. A positive electrode of the battery 10 is connected to a positive electrode terminal 50, and a negative electrode of the battery 10 is connected to a negative electrode terminal 51, and charging or discharging is performed via the positive electrode terminal 50 and the negative electrode terminal 51.

The battery 10 may include a plurality of battery modules 11a-11z that are connected in series or connected in series and in parallel. Also, each of the battery modules 11a-11z may include at least one battery cell 12. If a plurality of battery cells 12 are included in each of the battery modules 11a-11z, the battery cells 12 in each of the battery modules 11a-11z may be connected in series and/or in parallel. In one embodiment, the battery cells 12 are rechargeable secondary cells. In one embodiment, as shown in FIG. 1, the battery modules 11a-11z and the battery cells 12 will be described as being connected in series only. However, the battery modules 11a-11z may be connected in parallel with the battery cells 12.

The management units 20a-20n may be connected in series. The management units 20a-20n may monitor states of the battery cells 12 included in the battery modules 11a-11z to extract data of the battery cells 12. In one embodiment, the management units 20a-20n measure voltages, charging states, temperatures or other electrical or chemical characteristics of the battery cells 12. An uppermost management unit 20a includes a plurality of measuring units 21a-1 through 21a-m that are serially connected and a receiving unit 22a. The measuring units 21a-1 through 21a-m may be analog front ends (AFEs) that measure analog values from the battery cells 12, convert results of the measurement into digital data, and transmit the same.

The measuring units 21a-1 through 21a-m are each connected to at least one of the battery modules 11a-11m and monitor states of the battery cells 12 included in the battery modules 11a-11m. When monitoring the battery cells 12, the measuring units 21a-1 through 21a-m may periodically extract measured values as data. However, a data extracting method of the measuring units 21a-1 through 21a-m is not limited thereto; for example, the measuring units 21a-1 through 21a-m may extract values measured according to a control signal from the receiving unit 22a or the processor 40 as data.

The measuring units 21a-1 through 21a-m each transmit a monitoring result, that is, measurement data, to a next, serially connected measuring unit. For example, a first measuring unit 21a-1 transmits measurement data to a second measuring unit 21a-2. The second measuring unit 21a-2 transmits the measurement data received from the first measuring unit 21a-1 to a third measuring unit 21a-3 together with measurement data that is extracted by the second measuring unit 21a-2 itself. A last measuring unit 21a-m among the serially connected measuring units 21a-1 through 21a-m, that is, a main measuring unit 21a-m, receives all of extracted measurement data extracted by the previous, serially connected measuring units 21a-1 through 21a-(m-1). That is, all measurement data extracted from the management unit 20a are collected in the main measuring unit 21a-m so as to be transmitted to the receiving unit 22a.

Between the measuring units 21a-1 through 21a-m, data is transmitted to/from each other via an inter-integrated circuit bus (I2C) method. Also, when the main measuring unit 21a-m transmits data to the receiving unit 22a, data communication is performed using the I2C method. To this end, each of the measuring units 21a-1 through 21a-m may include a first communication unit 50 to perform data communication using the I2C method.

The receiving unit 22a receives measurement data extracted by the measuring units 21a-1 through 21a-m from the main measuring unit 21a-m. In addition, the receiving unit 22a receives measurement data collected by another receiving unit, or transmits measurement data received from another receiving unit or the measurement data collected from the measuring units 21a-1 through 21a-m of the management unit 20a, to which the receiving unit 22a belongs, to another receiving unit.

Between the main measuring unit 21a-m and the receiving unit 22a, data communication is performed using the I2C method (or the I2C protocol). The receiving unit 22a performs data communication with other receiving units using a low voltage differential signaling (LVDS) method. To this end, the receiving unit 22a may include one first communication unit 50 to perform data communication using the I2C method and a second communication unit 60 to perform data communication using the LVDS method (or the LVDS protocol).

The management unit 20a may be a single circuit board on which the measuring units 21a-1 through 21a-m and the receiving unit 22a are formed.

Here, only the uppermost management unit 20a is described but the rest of the management units 20b-20n may also be configured in the same manner, and thus repeated description will be omitted.

In one embodiment, the management units 20a through 20n are serially connected to measure states of the battery cells 12. A receiving unit 22n that is included in the management unit 20n, which is located in a lowest potential range, transmits collected data to a receiving unit 22(n-1) included in a next management unit 20(n-1). Here, a next management unit refers to a management unit which is connected in series and located in a potential range that is higher than that of another management unit. By sequentially transmitting data from a lower potential to a higher potential, the main receiving unit 22a, which is located in the highest potential range, collects data of all battery cells 12 included in the battery 10. The main receiving unit 22a transmits the collected data to the insulator circuit 30. Although the FIG. 1 embodiment shows only one insulator circuit 30 which is connected to only the management units 20a, the battery system 101 may include at least one other insulator circuit electrically connected to other management unit(s).

The insulator circuit 30 is a data transmission path between the main receiving unit 22a and the processor 40. The insulator circuit 30 insulates the management units 20a-20n and the processor 40 from each other by separating their ground. The insulator circuit 30 may be, for example, a level shift circuit, an optical isolator circuit, etc.

In one embodiment, the insulator circuit 30 performs data communication with the main receiving unit 22a using the LVDS method. To this end, the insulator circuit 30 may include one second communication unit 60 to perform data communication using the LVDS method.

The processor 40 controls charging or discharging of the battery 10 by using data about the battery cells 12 received via the insulator circuit 30. The processor 40 may perform data communication using the LVDS method. To this end, the processor 40 may include one second communication unit 60 to perform data communication using the LVDS method.

Hereinafter, characteristics of the I2C method and the LVDS method will be compared with reference to Table 1.

TABLE 1

|  | I2C | LVDS |
|---|---|---|
| Characteristics | 1. Data speed:<br>100 kbps (standard mode)<br>400 kbps (fast mode)<br>3.4 Mbps (high speed mode)<br>2. Separated clock line and single signal line<br>3. TTL logic voltage is used | 1. Hihg data speed<br>If bus size is 10 m or less,<br>100 Mbps<br>Maximum 655 Mbps<br>2. Differential data transmission<br>3. Low voltage, low driving current 3.5~10 mA |
| Advantages | 1. Easily implementable mounted in many ICs | 1. Resistant to noise<br>2. Low power consumption<br>3. Hihg data transmission speed<br>4. Independent from power supply compatible with ground insulation |
| Disadvantages | 1. Low data transmission speed<br>2. Hihg current consumption for data transmission<br>3. Noise error possibility is high due to single data transmission line<br>4. Pull-up is necessary | 1. High consts<br>2. Additional IC is necessary for implementation |

As can be seen from FIG. 1, an amount of data transmission between the measuring units 21a-1 through 21a-m is greater than an amount of data transmission between the receiving units 22a-22n. This is because an amount of collected measurement data is increased toward the main measuring unit 21a-m, and because the receiving units 22a-22n collect their collected measurement data in the main receiving unit 22a. Accordingly, in a configuration with a large amount of data transmission, rather than in a configuration with a small amount of data transmission, data communication may be performed using a communication method having a high transmission speed.

As shown in Table 1, a data transmission speed of the LVDS method is higher than that of the I2C method. Accordingly, the first communication units 50 are designed to perform the I2C method, and the second communication unit 60 is designed to perform the LVDS method.

However, the above configurations are not considered limiting. That is, as long as the communication method performed by the second communication units 60 has a higher data transmission speed than that of the communication method performed by the first communication units 50, the first communication units 50 and the second communication units 60 may use any of various communication methods.

Meanwhile, while the insulator circuit 30 receives measurement data from the receiving unit 22a included in the uppermost management unit 20a in the current embodiment, this is not considered limiting. That is, the receiving unit included in any of the other management units 20b-20n may also be set as the main receiving unit.

Figure 2:
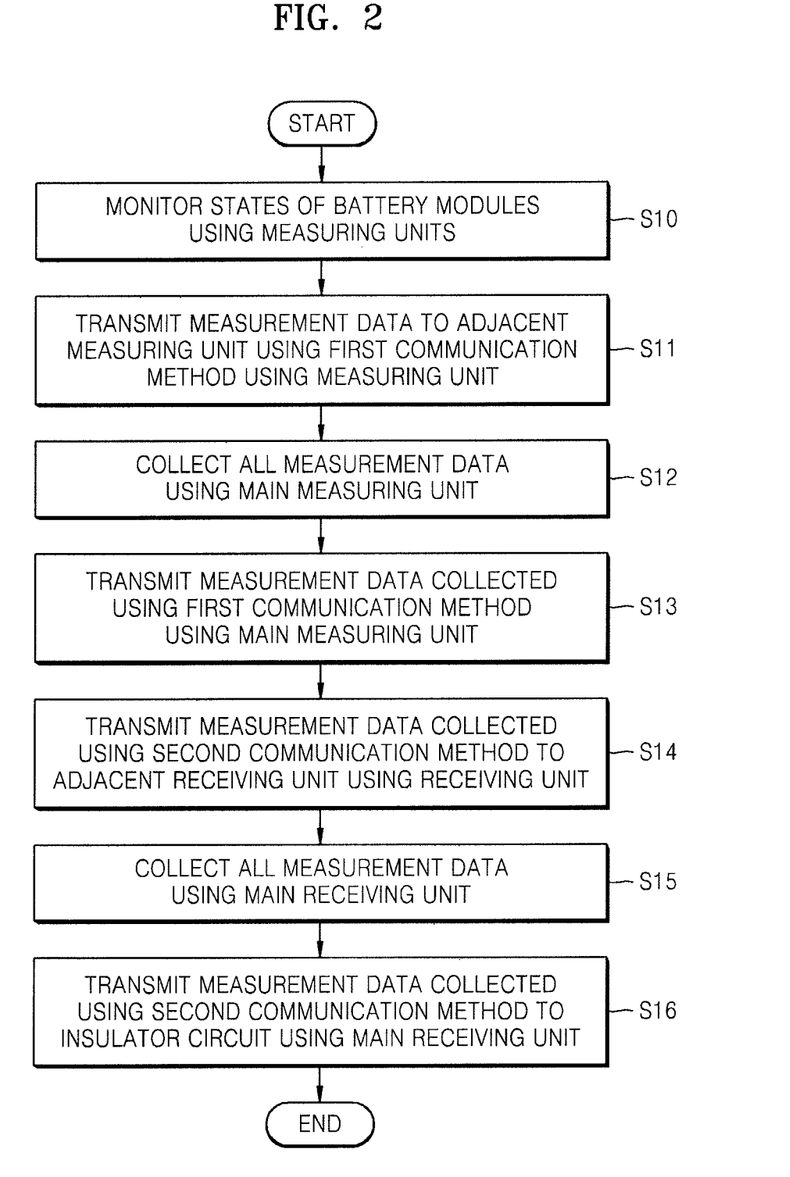
FIG. 2 is a flowchart illustrating a method of controlling the battery system of FIG. 1.

FIG. 2 is a flowchart illustrating a method of controlling the battery system 101 of FIG. 1. Depending on the embodiment, the order of the operations shown in FIG. 2 may be changed, certain operations may be omitted, and additional operations may be added. Referring to FIG. 2, in operation S10, the measuring units 21a-1 through 21a-m monitor states of the battery modules 11a-11m. In operation S11, the measuring units 21a-1 through 21a-m each transmit measurement data to an adjacent measuring unit using a first communication method, for example, the I2C method.

All of the transmitted measurement data are collected in the main measuring unit 21a-m in operation S12. In one embodiment, the main measuring unit 21a-m transmits the measurement data collected using the first communication method to the receiving unit 22a in operation S13.

Here, only the management unit 20a is described, but operations S10 through S13 are performed in the same manner in regard to the rest of the management units 20b-20n.

In one embodiment, the receiving units 22b-22n each transmit the collected measurement data to an adjacent receiving unit using a second communication method, for example, the LVDS method, in operation S14. All of the transmitted measurement data are collected in the main receiving unit 22a in operation S15.

The main receiving unit 22a may transmit the collected measurement data to the insulator circuit 30 using the second communication method, and the insulator circuit 30 may transmit the received measurement data to the processor 40 using the second communication method again.

As described above, data transmission speeds between the receiving units 22a-22n, between the main receiving unit 22a and insulator circuit 30, and between the insulator circuit 30 and the processor 40, where data transmission amounts are large, are set to be faster than a data transmission speed between the measuring units 22a-1 through 22a-m. Thus, data may be transmitted between components at a high speed while being strong against noise and with low power consumption.

Figure 3:
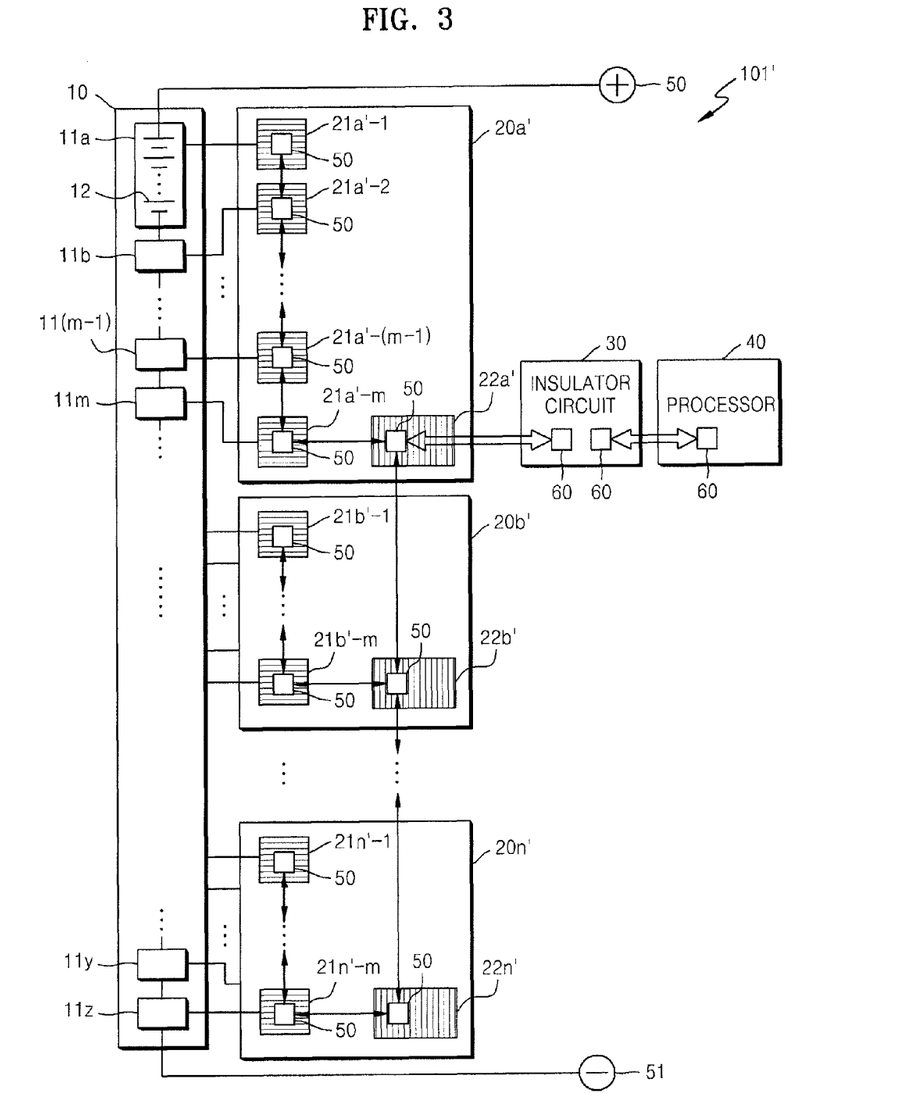
FIG. 3 is a block diagram illustrating a battery system according to another embodiment.

FIG. 3 is a block diagram illustrating a battery system 102 according to another embodiment.

Referring to FIG. 3, the battery system 101' includes a battery 10, a plurality of management units 20a'-20n', an insulator circuit 30, and a processor 40. The battery system 101' has the same elements and functions as the battery system 101 of FIG. 1, and thus herein description will focus on differences therefrom. The battery system 101' may include additional elements or omit some of the above elements depending on the embodiment.

In one embodiment, the I2C method is used as a communication method between the receiving units 22a' through 22n'. Also, the I2C method may be used as a communication method between the measuring units 21a'-1 through 21a'-m and between the main measuring unit 21a'-m and the receiving unit 22a'.

In one embodiment, the LVDS method is used as a communication method between the main receiving unit 22a' and the insulator circuit 30 and between the insulator circuit 30 and the processor 40.

Figure 4:
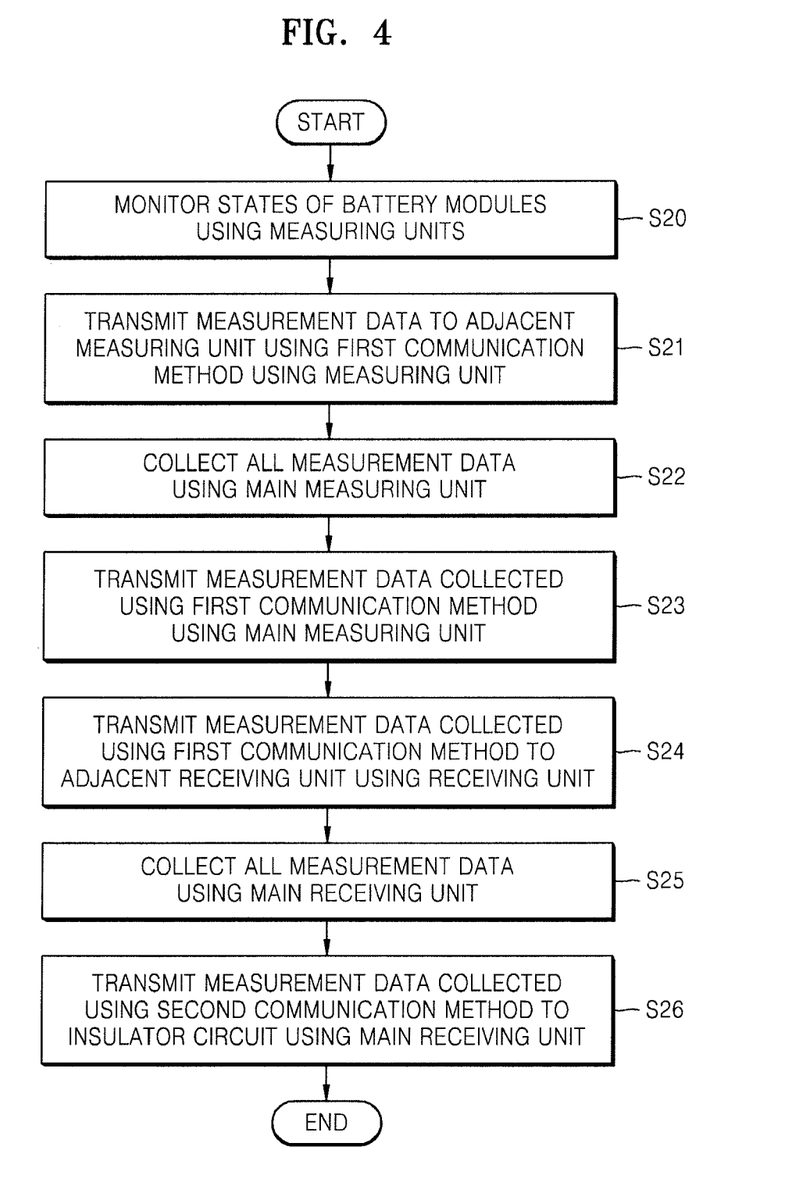
FIG. 4 is a flowchart illustrating a method of controlling the battery system of FIG. 3.

FIG. 4 is a flowchart illustrating a method of controlling the battery system 101' of FIG. 3. Depending on the embodiment, the order of the operations shown in FIG. 4 may be changed, certain operations may be omitted, and additional operations may be added.

Referring to FIG. 4, in operation S20, the measuring units 21a'-1 through 21a'-m monitor states of the battery modules 11a-11m. The measuring units 21a'-1 through 21a'-m each transmit measurement data to an adjacent measuring unit using a first communication method, for example, the I2C method, in operation S21.

All of the transmitted measurement data are collected in the main measuring unit 21a'-m in operation S22. And the main measuring unit 21a'-m may transmit the measurement data collected using the first communication method to the receiving unit 22a' in operation S23.

Here, only the management unit 20a' is described, but operations S20 through S23 are performed in the same manner in regard to the rest of the management units 20b'-20n'.

The receiving units 22b'-22n' each transmit the collected measurement data to an adjacent receiving unit using the first communication method in operation S24. All of the transmitted measurement data are collected in the main receiving unit 22a' in operation S25.

In operation S26, the main receiving unit 22a' transmits the collected measurement data to the insulator circuit 30 using a second communication method, for example, the LVDS method, and the insulator circuit 30 may transmit the received measurement data to the processor 40 using the second communication method again.

As described above, according to the battery system 101', data transmission speeds between the main receiving unit 22a' and insulator circuit 30 and between the insulator circuit 30 and the processor 40, where data transmission amounts are large, are set to be faster than a data transmission speed between the measuring units 22a'-1 through 22a'-m and between the receiving units 22a' through 22n'. Thus, data may be transmitted between components at a high speed while being strong against noise and with low power consumption.

Figure 5:
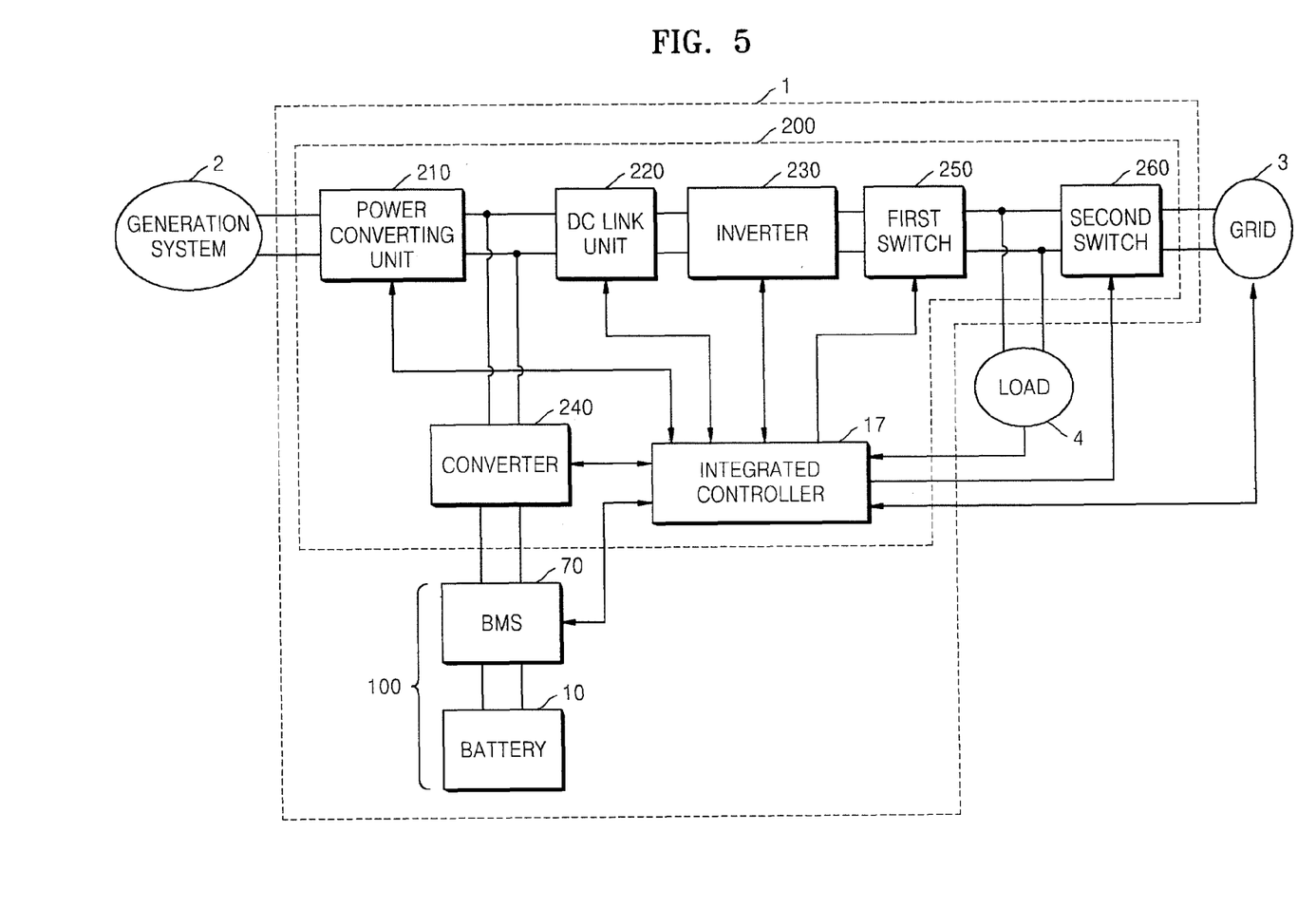
FIG. 5 is a block diagram illustrating an energy storage system according to an embodiment.

FIG. 5 is a block diagram illustrating an energy storage system 1 according to an embodiment.

Referring to FIG. 5, the energy storage system 1 supplies power to a load 4 in connection with a generation system 2 and a grid 3. The energy storage system 1 may include additional elements or omit some of the above elements depending on the embodiment.

The generation system 2 produces power using an energy source. The generation system 2 supplies the produced power to the energy storage system 1. The generation system 2 may be a solar energy generation system, a wind power generation system, a tidal power generation system, etc. However, the generation system 2 is not limited thereto. Any electricity generation system that produces electricity using new, recycled energy, such as solar heat and geothermal heat, may be used as the generation system 2.

The grid 3 includes a power plant, a transformer substation, power lines, etc. In a normal state, the grid 3 supplies power to the energy storage system 1 so as to supply power to the load 4 and/or a battery 10, and receives power from the energy storage system 1. In an abnormal state, power supply from the grid 3 to the energy storage system 1 is stopped, and power supply from the energy storage system 1 to the grid 3 is also stopped.

The load 4 consumes power produced using the generation system 2, power stored in the battery 10, or power supplied from the grid 3. The load 4 may be, for example, a home or a factory.

The energy storage system 1 stores power produced by the generation system 2 in the battery 10 and supplies the produced power to the grid 3. Also, the energy storage system 1 may supply power stored in the battery 10 to the grid 3 or power supplied from the grid 3 to the battery 10. Also, if the grid 3 is in an abnormal state, for example, in blackout cases, the energy storage system 1 performs an uninterruptible power supply (UPS) operation to supply power to the load 4. Also, the energy storage system 1 may also supply the power produced by the generation system 2 or the power stored in the battery 10 to the load 4 when the grid 3 is in the normal state.

The energy storage system 1 includes a power control system (PCS) 200 for controlling power conversion, a battery management system (BMS) 70, and the battery 10.

The PCS 200 converts power of the generation system 2, the grid 3, or the battery 10 into a proper form of power to supply the same to wherever the power is necessary. The PCS 200 includes a power converting unit 210, a DC link unit 220, an inverter 230, a converter 240, a first switch 250, a second switch 260, and an integrated controller 270.

The power converting unit 210 is connected between the generation system 2 and the DC link unit 220. The power converting unit 210 transfers power produced by the generation system 2 to the DC link unit 220; here, the power converting unit 210 converts an output voltage into a direct current link voltage. In particular, when the generation system 2 produces power from solar light, the power converting unit 210 may include a maximum power point tracking (MPPT) converter that conducts MPPT control in order to maximize power produced from the generation system 2 according to variations in solar irradiance, temperature, or the like.

The direct current link voltage may be unstable in size due to a transient voltage drop in the generation system 2 or the grid 3 or a peak load generated in the load 4. However, the direct link voltage is to be stable so as to allow normal operations of the converter 240 and the inverter 230. The DC link unit 220 may include, for example, a large capacity capacitor for stabilizing the direct current link voltage, and the DC link unit 220 is connected between the power converting unit 210 and the inverter 230 to uniformly maintain the direct current link voltage.

The inverter 230 is a power converter connected between the DC link unit 220 and the first switch 250. The inverter 230 may include an inverter that converts the direct current link voltage output from the generation system 2 and/or the battery 10 in a discharge mode into an alternating current voltage and outputs the same. Also, in order to store power of the grid 3 in a charging mode in the battery 10, the inverter 230 may include a rectifying circuit that rectifies an alternating current voltage of the grid 3 and converts the same into the direct current link voltage. The inverter 230 may include a bi-directional inverter or a plurality of inverting circuits.

The inverter 230 may include a filter to remove harmonic waves from an alternating current voltage output therefrom. Also, the inverter 230 may include a phase locked loop (PLL) circuit to synchronize a phase of the alternating current voltage output from the inverter 230 with a phase of an alternating current voltage of the grid 3 in order to prevent reactive power from generating. In addition, the inverter 230 may restrict a voltage fluctuation range, improve a power factor, remove direct current components, prevent transient phenomena, or the like.

The converter 240 is a power converter connected between the DC link unit 220 and the battery 10. In one embodiment, the converter 240 includes a converter that performs DC-DC conversion, and more specifically, converting power stored in the battery 10 in a discharging mode to a voltage level desired by the inverter 230, that is, to the direct current link voltage, and outputs the same. Also, the converter 240 includes a converter that converts a voltage of power output from the power converter 210 or power output from the inverter 230 to a voltage level desired by the battery 10, that is, a charging voltage. The converter 240 may include a bi-directional converter or a plurality of converting circuits.

The first switch 250 and the second switch 260 are serially connected between the inverter 230 and the grid 3, and are turned on/off according to a control of the integrated controller 270 to control a current flow between the generation system 2 and the grid 3. The first switch 250 and the second switch 260 may be turned on/off according to states of the generation system 2, the grid 3, and the battery 10. For example, if a large amount of power is required by the load 4, the first switch 250 and the second switch 260 are both turned on to supply power of the generation system 2, the grid 3, and the battery 10 to the load 4. On the other hand, if a blackout is generated in the grid 3, the second switch 260 is turned off, and the first switch 250 is turned on. Accordingly, power from the generation system 2 or the battery 10 may be supplied to the load 4, and a stand-alone operation in which the power supplied to the load 4 flows toward the grid 3 is prevented, thereby preventing accidents such as electric shock of workers working on power lines of the grid 3.

The integrated controller 270 monitors states of the generation system 2, the grid 3, the battery 10, and the load 4, and controls the power converting unit 210, the inverter 230, the converter 240, the first switch 250, the second switch 260, and the BMS 70 according to monitoring results. Details monitored by the integrated controller 270 may include whether a blackout is generated in the grid 3, whether power is produced by the generation system 2, and the like. Also, the integrated controller 270 may monitor an amount of power produced by the generation system 2, a charging state of the battery 10, power consumption of the load 4, time, or the like.

The BMS 70 is connected to the battery 10, and controls charging or discharging of the battery 10 according to a control by the integrated controller 270. In order to protect the battery 10, the BMS 70 may prevent overcharging, overdischarging, an overcurrent, an overvoltage, and overheating, and may perform cell balancing. To this end, the BMS 70 may monitor charge, a current, a temperature, a remaining power amount, lifetime, a charging state of the battery 10, and may apply monitoring results to the integrated controller 270.

The battery 10 receives power produced using the generation system 2 or power of the grid 3 and stores the same, and supplies the power stored to the load 4 or the grid 3. A number of the batteries 10 may be determined according to power capacity, and design conditions required by the energy storage system 1. For example, if the load 4 consumes a large amount of power, a plurality of batteries 10 may be included, and if the load 4 consumes a small amount of power, only one battery 10 may be included.

Meanwhile, the battery systems 101 and 101' described with reference to FIGS. 1 and 3 may be used as the battery system 100 including the battery 10 and the BMS 70. The BMS 70 may include a plurality of management units, an insulator circuit 30, and a processor 40.

As described above, in the energy storage system 1 according to the current embodiment, the battery system 100 may efficiently transmit data.

According to at least one of the disclosed embodiments, battery systems capable of efficiently conducting data communication may be provided.

It should be understood that the disclosed embodiments should be considered in a descriptive sense only and not for purposes of limitation. Descriptions of features or aspects within each embodiment should typically be considered as available for other similar features or aspects in other embodiments.

What is claimed is:

1. A battery system comprising:
   a plurality of battery modules each of which is configured to store power, wherein each battery module is electrically connected to at least one other battery module; and
   a plurality of management units configured to monitor states of the battery modules, wherein each management unit is electrically connected to at least one other management unit, and wherein each of the management units is electrically connected to one or more of the battery modules,
   wherein each of the management units comprises:
   at least one measuring unit configured to perform the monitoring; and
   a receiving unit configured to i) receive measurement data including the monitoring results from the at least one measuring unit via a first communication protocol and ii) receive measurement data from another receiving unit included in another management unit via a second communication protocol which is different from the first communication protocol.

2. The battery system of claim 1, wherein the at least one measuring unit comprises a plurality of measuring units which are configured to communicate data with one another via the first communication protocol.

3. The battery system of claim 1, wherein each of the measuring unit and the receiving unit comprises a first communication unit which is configured to communicate data via the first communication protocol.

4. The battery system of claim 1, further comprising an insulator circuit electrically connected to one of the management units and configured to receive all the measurement data from the one management unit via the second communication protocol.

5. The battery system of claim 1, wherein each of i) the insulator circuit and ii) the receiving unit electrically connected to the insulator circuit comprises a second communication unit which is configured to communicate data via the second communication protocol.

6. The battery system of claim 1, wherein the first communication protocol is an inter integrated circuit (I2C) protocol.

7. The battery system of claim 1, wherein the second communication protocol is a low voltage differential signaling (LVDS) protocol.

8. The battery system of claim 1, wherein the data transmission speed of the second communication protocol is faster than that of the first communication protocol.

9. The battery system of claim 1, wherein each of the battery modules comprises at least one battery cell, and wherein the states of the battery modules comprise at least one of the following: voltages, charging states, temperatures and other electrical or chemical characteristics of the battery cells.

10. A battery system comprising:
a plurality of battery modules each of which is configured to store power, wherein each battery module is electrically connected to at least one other battery module;
a plurality of management units configured to monitor states of the battery modules, wherein each of the management units is electrically connected to one or more of the battery modules, and wherein each management unit is configured to communicate data with at least one other management unit via a first communication protocol; and
an insulator circuit electrically connected to one of the management units and configured to receive the monitoring results from the one management unit via a second communication protocol which is different from the first communication protocol.

11. The battery system of claim 10, wherein each of the management units comprises:
at least one measuring unit configured to perform the monitoring; and
a receiving unit configured to i) receive measurement data including the monitoring results from the at least one measuring unit via the first communication protocol and ii) receive measurement data from another receiving unit included in another management unit via the first communication protocol.

12. The battery system of claim 11, wherein each of i) the insulator circuit and ii) the receiving unit electrically connected to the insulator circuit comprises a second communication unit which is configured to perform data communication via the second communication protocol.

13. The battery system of claim 11, wherein the at least one measuring unit comprises a plurality of measuring units which are configured to communicate data with one another via the first communication protocol.

14. The battery system of claim 10, wherein each of the battery modules comprises at least one battery cell, and wherein the states of the battery modules comprise at least one of the following: voltages, charging states, temperatures and other electrical or chemical characteristics of the battery cells.

15. The battery system of claim 10, wherein the first communication protocol is an inter integrated circuit (I2C) protocol.

16. The battery system of claim 10, wherein the second communication protocol is a low voltage differential signaling (LVDS) protocol.

17. The battery system of claim 10, wherein the data transmission speed of the second communication protocol is faster than that of the first communication protocol.

18. A battery system comprising:
a plurality of battery modules each of which is configured to store power, wherein each battery module is electrically connected to at least one other battery module;
a plurality of measuring units configured to monitor states of the battery modules and are divided into a first group and a second group, wherein the first group includes a first plurality of measuring units, wherein the second group includes a second plurality of measuring units, wherein each management unit is electrically connected to at least one other management unit, and wherein each of the management units is electrically connected to one or more of the battery modules;
a first sub-data collection unit configured to receive first measurement data including monitoring results from the first measurement units via a first communication protocol;
a second sub-data collection unit configured to receive second measurement data including monitoring results from the second measurement units via the first communication protocol; and
an insulator circuit configured to receive the first and second measurement data via a second communication protocol which is different from the first communication protocol.

19. The battery system of claim 18, wherein the first and second sub-data collection units are configured to transmit the measurement data to a first data collection unit via the first communication protocol, wherein the first data collection unit is configured to receive the measurement data from the first and second sub-data collection units and provide the received measurement data to the insulator circuit, and wherein the second sub-data collection unit is configured to transmit the measurement data to the insulator circuit via the second communication protocol.

20. The battery system of claim 18, wherein the data transmission speed of the second communication protocol is faster than that of the first communication protocol.

* * * * *